United States Patent
Schmitt et al.

(10) Patent No.: US 9,488,053 B2
(45) Date of Patent: Nov. 8, 2016

(54) METHOD FOR REPAIRING A SINGLE CRYSTAL TURBINE BLADE

(71) Applicant: ALSTOM Technology Ltd, Baden (CH)

(72) Inventors: Tobias Schmitt, Olten (CH); Hans Bissig, Wohlen (CH); Stefan Schlegel, Künten (CH); Guenter Ambrosy, Fislisbach (CH); Michael Seemann, Laufenburg (DE); Hermann Emminger, Fahrwangen (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 11 days.

(21) Appl. No.: 14/591,332

(22) Filed: Jan. 7, 2015

(65) Prior Publication Data

US 2015/0184514 A1    Jul. 2, 2015

Related U.S. Application Data

(63) Continuation of application No. PCT/EP2013/064706, filed on Jul. 11, 2013.

(30) Foreign Application Priority Data

Jul. 12, 2012 (EP) .................................. 12176167

(51) Int. Cl.
*F01D 5/00* (2006.01)
*B23P 6/00* (2006.01)
(Continued)

(52) U.S. Cl.
CPC ............... *F01D 5/005* (2013.01); *B23P 6/007* (2013.01); *F01D 5/186* (2013.01);
(Continued)

(58) Field of Classification Search
CPC ........ F01D 5/005; F01D 5/186; B23P 6/007; Y10T 29/49318; Y10T 29/49734; Y10T 29/49737; Y10T 29/49742; B23K 26/342
See application file for complete search history.

(56) References Cited

U.S. PATENT DOCUMENTS 4,141,127 A * 2/1979 Cretella ............... B23K 10/027
                                                       228/119
5,822,852 A    10/1998 Bewlay et al.
(Continued)

FOREIGN PATENT DOCUMENTS

EP    1 262 632 A1    12/2002
EP    1 674 658 A1    6/2006
(Continued)

OTHER PUBLICATIONS

Michael Bernard Henderson, Nickel based superalloy welding practices for industriral gas turbine applications, Jan. 2004, Science and Technology of Welding & Joining.*
(Continued)

*Primary Examiner* — Jason L Vaughan
*Assistant Examiner* — Amanda Meneghini
(74) *Attorney, Agent, or Firm* — Buchanan Ingersoll & Rooney PC

(57) ABSTRACT

A method is provided for repairing a single crystal turbine blade, which includes an airfoil with a tip having a tip cover plate, tip cooling air holes and a tip crown. The method includes removing the tip crown by manual grinding, thereby preserving the underlying tip cover plate; preparing the tip cooling air holes by manual grinding; closing said prepared tip cooling air holes by manual welding; and building-up a new tip crown by a LMF (Laser Metal Forming) process.

20 Claims, 4 Drawing Sheets

(51) Int. Cl.
*F01D 5/18* (2006.01)
*F01D 5/20* (2006.01)

(52) U.S. Cl.
CPC .......... *B23K 2201/001* (2013.01); *F01D 5/20* (2013.01); *F05D 2230/10* (2013.01); *F05D 2230/232* (2013.01); *F05D 2230/234* (2013.01); *F05D 2230/235* (2013.01); *F05D 2230/31* (2013.01); *F05D 2230/80* (2013.01); *F05D 2230/90* (2013.01); *F05D 2300/607* (2013.01)

(56) References Cited

U.S. PATENT DOCUMENTS

| | | | | |
|---|---|---|---|---|
| 5,972,424 | A * | 10/1999 | Draghi | B23P 6/007 29/889.1 |
| 6,332,272 | B1 * | 12/2001 | Sinnott | B23P 6/002 29/402.08 |
| 6,573,474 | B1 * | 6/2003 | Loringer | B23K 26/3273 219/121.71 |
| 7,474,478 | B2 * | 1/2009 | Fukuta | G02B 9/34 359/715 |
| 2003/0082297 | A1 * | 5/2003 | Wolkers | B23P 6/002 427/140 |
| 2010/0050435 | A1 | 3/2010 | Zainuddin et al. | |
| 2011/0052386 | A1 | 3/2011 | Schoonover et al. | |

FOREIGN PATENT DOCUMENTS

| | | | |
|---|---|---|---|
| EP | 1 701 004 A1 | 9/2006 | |
| EP | 1701004 A1 * | 9/2006 | ............. B23P 6/007 |

OTHER PUBLICATIONS

NPL—M.B. Henderson et al, "Nickel-Based Superalloy Welding practices for Industrial Gas Turbine Applications", vol. 9, Issue 1 (Feb. 1, 2004).

* cited by examiner

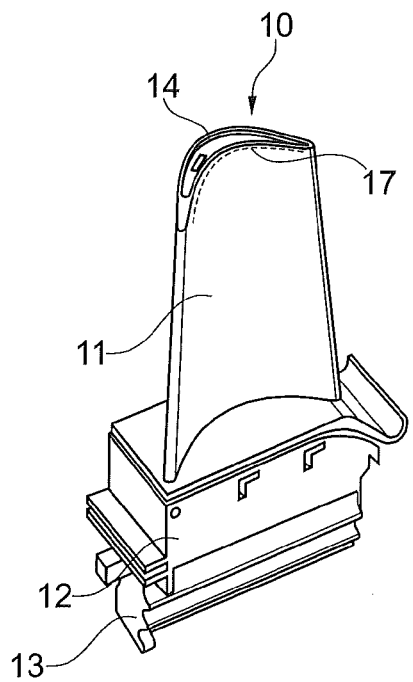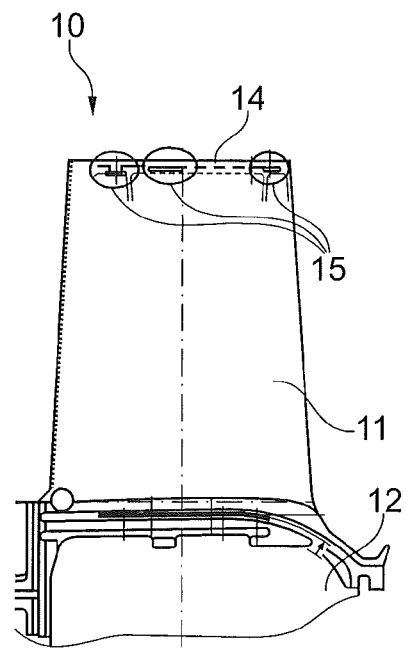
Fig. 1
Fig. 2
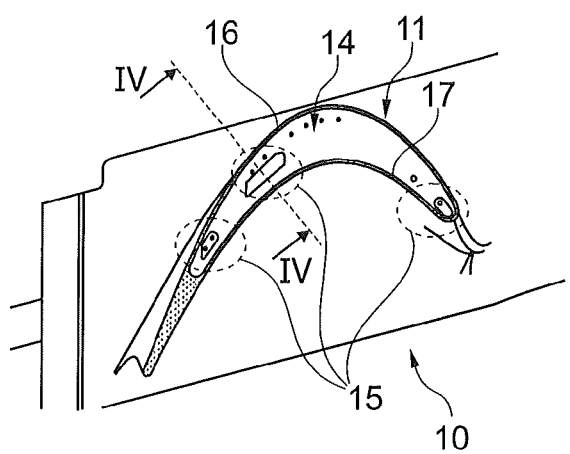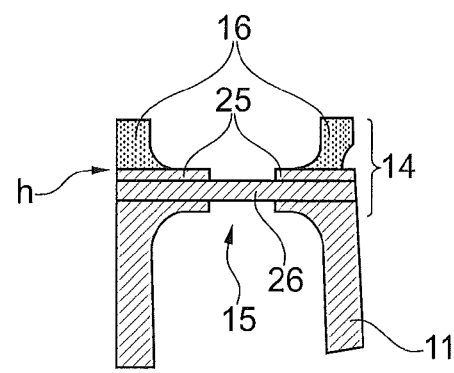
Fig. 3
Fig. 4

METHOD FOR REPAIRING A SINGLE CRYSTAL TURBINE BLADE

CROSS-REFERENCE TO RELATED APPLICATIONS

This application claims priority to PCT/EP2013/064706 filed Jul. 11, 2013, which claims priority to European application 12176167.0 filed Jul. 12, 2012, both of which are hereby incorporated in their entireties.

TECHNICAL FIELD

The present invention relates to the technology of gas turbines.

BACKGROUND

FIG. 1 shows a photograph of a typical gas turbine blade 10 in a perspective view. The turbine blade 10 comprises an airfoil 11, which extends in radial direction from a shaft and ends with a blade tip 14. Below the shaft 12 a foot 13 of the fir-tree type is provided for mounting the blade in a respective groove of the rotor. Part of the blade tip 14 is a crown (16 in FIG. 4), a circumferential rim. FIG. 2 is a side view of the blade 10. FIG. 3 is a top view. Further features of the blade tip 14 are tip cooling air holes 17 and so-called letterboxes 15, slots in the tip cover plate (25 in FIG. 4), which are closed by brazed closing plates (26 in FIG. 4).

The tip of a moving turbine blade is often prone to damages, which have to be repaired in order to restore the efficiency of the turbine. A special problem is connected with such a repair when the blade is of the single crystal type.

Document US 2011/052386 A discloses a method for depositing material on a turbine airfoil having a tip wall extending past a tip cap, wherein the tip wall includes a first alloy with a single crystal microstructure. The method includes: depositing a second alloy on at least a portion of the tip wall to form a repair structure, wherein a high temperature oxidation resistance of the second alloy is greater than a high temperature oxidation resistance of the first alloy, and wherein the repair structure has a crystallographic orientation that is substantially the same as a crystallographic orientation of the tip wall.

Document EP 1 674 658 A1 furnishes a damaged gas turbine blade which has previously been in service, and which is made of a base metal. Any damaged material is removed from the damaged blade tip. The damaged blade tip is weld repaired with a nickel-base superalloy that is more resistant to oxidation resistance than is the base metal in the operating environment of the tip-repaired gas turbine blade. The method does not include any step of coating a lateral surface of the repaired blade tip with a non-ceramic coating after the step of weld repairing.

Document US 2010/050435 A1 discloses a gas turbine blade, a gas turbine blade airfoil repair method, and an airfoil corresponding to the product of the method. The airfoil extends radially from a platform and includes a tip having a tip edge radially distant from the platform; a trailing edge; and a leading edge. The method includes forming a joining plane extending from the leading edge to the tip edge, wherein the joining plane forms at least one arc; forming a replacement tip fittable on the joining plane; and bonding the replacement tip to the airfoil.

In document EP 1 701 004 A1 a repaired gas turbine blade has a monocrystalline airfoil made of a first nickel-base superalloy, and a repair squealer tip welded to a tip of the airfoil. The repair squealer tip is made of a second nickel-base superalloy different from the first nickel-base superalloy and having less than about 0.15 weight percent total of carbon, boron, silicon, zirconium, and hafnium.

Document U.S. Pat. No. 6,332,272 B1 discloses a method for repairing a turbine blade wherein the tip of the blade is removed and a replacement cap is attached by welding. The cap may consist of a plate attached by welding and a squealer formed by depositing weld material. The plate and/or squealer may be formed from a material different from the material of the airfoil portion of the blade in order to optimize the performance of the blade.

The various known repairing methods for blade tips have different disadvantages.

For some methods there is not enough remaining wall thickness and attachment points for crown plate replacement, resulting in a high risk of failure (high temperature, high load on tip of the first blades). A full letterbox removal for crown plate replacement would cause either a dimensional change of the repaired blade or cause complicated repair effort to keep original dimensions.

A restoration of blade crown height by LMF (Laser Metal Forming) and subsequent crack brazing of letterboxes is not applicable in other cases for following reasons: The method works only for lightly damaged parts, combined welding and brazing would massively exceed any reconditioning cost restrictions.

An EDM removal of damaged tip letterbox and replacement with new brazed-in letterbox is not applicable in other cases for following reasons: A letterbox replacement has high risk of NCR and is an instable process, there is no solution for crown replacement, and the high costs exceed reconditioning cost restrictions for such a component.

The method for replacing blade tips of directionally solidified and single crystal turbine blades according to document U.S. Pat. No. 5,822,852 with a replacement of the squealer tip by brazing or welding is not applicable in other cases for following reasons: There is no solution for damaged ex-service letterbox repair, there is problematic handling of tip cooling air holes with squealer tip replacement, and damages below squealer tip level cannot be repaired.

SUMMARY

It is an object of the present invention to provide a method for repairing a single crystal turbine blade, which avoids the disadvantages of known methods and preserves the structural integrity of original cast material by preserving as much of it as possible during the repair process and reduces the repairing efforts.

This object is obtained by a method according to claim 1.

According to the invention, the method for repairing a single crystal turbine blade, which comprises an airfoil with a tip having a tip cover plate, tip cooling air holes and a tip crown, comprises the steps of:

a) removing the tip crown by manual grinding, thereby preserving the underlying tip cover plate;
b) preparing the tip cooling air holes by manual grinding;
c) closing said prepared tip cooling air holes by manual welding; and
d) building-up a new tip crown by a LMF (Laser Metal Forming) process.

According to an embodiment of the invention the tip comprises at least one letterbox, and that said at least one letterbox is prepared in step (b) by manual grinding and closed in step (c) by manual welding. The letterbox comprises a slot in the tip cover plate of the blade and a closing plate by which the slot can be closed by brazing the closing plate. Typically at least one side wall of the blade has a slit arranged in the region of the cover plate which allows insertion of the closing plate. The cover plate can extend to the surface of the blade wall thereby closing the slit when it is inserted into the letterbox.

According to another embodiment of the invention the tip comprises at least one damaged region, which extends beyond the crown into the airfoil and that said at least one damaged region is prepared in step (b) by manual grinding and closed in step (c) by manual welding.

According to another embodiment of the invention a TIG (Tungsten Inert Gas) welding process is used for the manual welding in step (c).

According to a further embodiment of the invention the tip is contour-grinded in preparation for the LMF welding process between steps (c) and (d).

According to just another embodiment of the invention the LMF process uses an oscillating weld path for optimum weld quality and heat transport during the LMF process.

According to still another embodiment of the invention after finishing the LMF process step (d) the tip area of the turbine blade is finally contoured by manual grinding.

Specifically, the final height of the tip is established by CNC machining.

According to a further embodiment of the invention after finishing the outer contour of the turbine blade the blade is coated with a coating layer.

Specifically, after coating the blade the closed tip cooling air holes are re-drilled, especially by means of a laser.

According to a further embodiment of the invention the turbine blade is provided with other cooling air holes outside of the tip, and that these other cooling air holes are re-opened after having been overcoated.

BRIEF DESCRIPTION OF THE DRAWINGS

The present invention is now to be explained more closely by means of different embodiments and with reference to the attached drawings.

FIG. 1 shows a photograph of a typical gas turbine blade in a perspective view;

FIG. 2 shows the turbine blade of FIG. 1 in a side view;

FIG. 3 shows the turbine blade of FIG. 1 in a top view;

FIG. 4 shows a sectional view of the blade tip along the line IV-IV in FIG. 3;

DETAILED DESCRIPTION

A main characteristic of the method according to the invention is to preserve as much original cast base material as possible during blade tip repair to ensure structural integrity.

The blade crown is removed by manual grinding thereby preserving the whole crown plate and ex-service letterboxes.

The letterboxes and tip cooling air holes are sealed by manual TIG welding.

The blade crown is built-up by laser metal forming (LMF).

The various process steps are shown in the Figures:

As shown in FIG. 4, the tip crown 16 is removed from the blade tip 14 to a height h by manual grinding. The tip cover plate 25 is thereby preserved.

Figure 5:
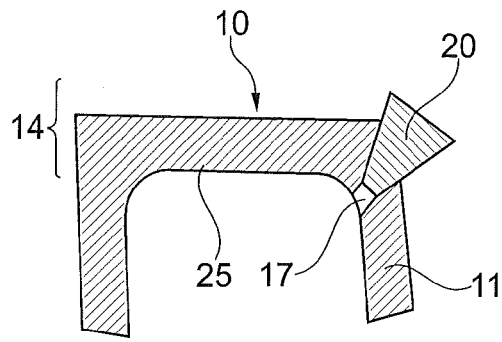
FIG. 5 shows a sectional view of the blade tip through a tip cooling air hole to be prepared by manual grinding.
Figure 7:
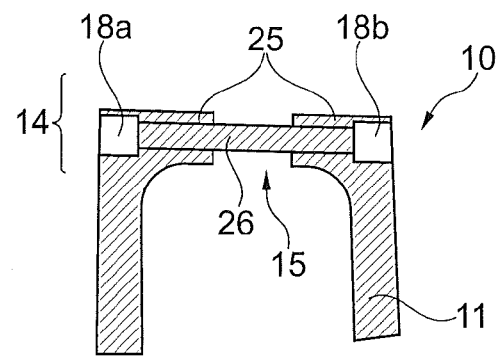
FIG. 7 shows a sectional view of the blade tip similar to FIG. 4 with the letterbox being prepared by manual grinding.

Then, according to FIGS. 5 and 7, the tip cooling air holes 17 and letterboxes 15 are prepared by manual grinding. For the preparation of the tip cooling air holes 17, a grinding tool 20 is used (FIG. 5). The preparation of the letterboxes 15 results in grinded recesses 18a and 18b (FIG. 7)

Figure 6:
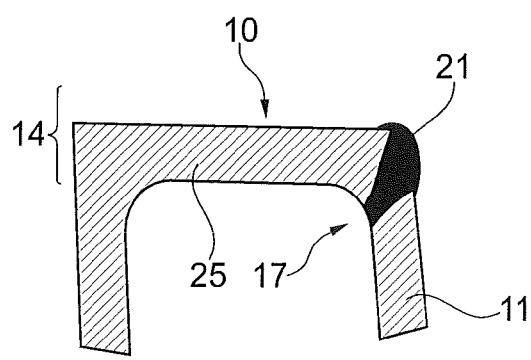
FIG. 6 shows the view of FIG. 5 with the prepared tip cooling air hole closed by manual welding.
Figure 8:
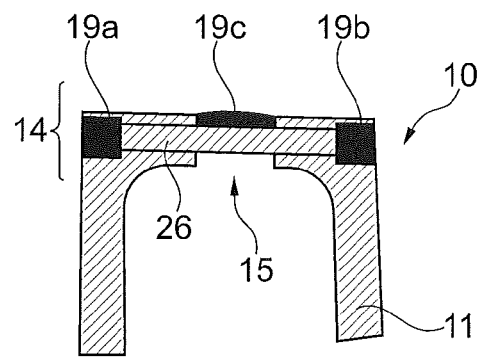
FIG. 8 shows the view of FIG. 7 with the prepared letterbox closed by manual welding.

Manual TIG welding is then used to close the letterboxes 15 with fillings 19a-c (FIG. 8), and the tip cooling air holes with fillings 21 (FIG. 6).

After the letterboxes and tip cooling air holes have been closed, contour grinding is applied to the tip as preparation for the subsequent LMF weld process.

Figure 9:
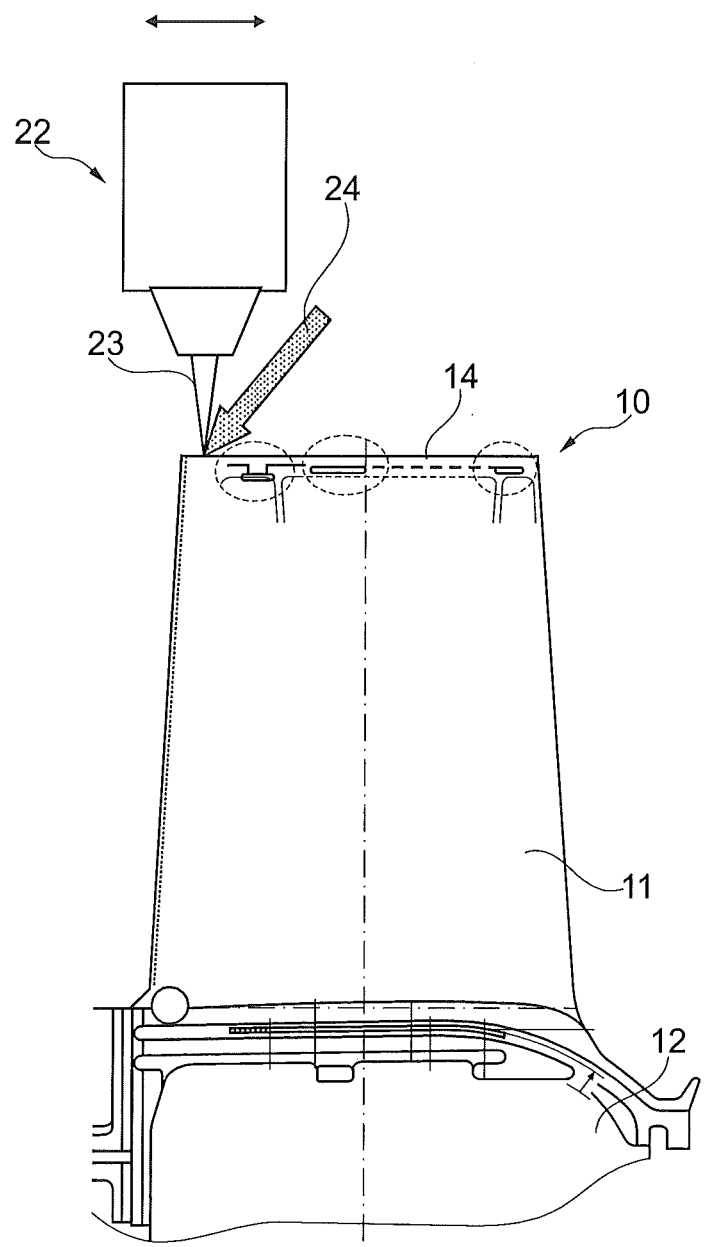
FIG. 9 shows the process of LMF for building-up a new crown.
Figure 10:
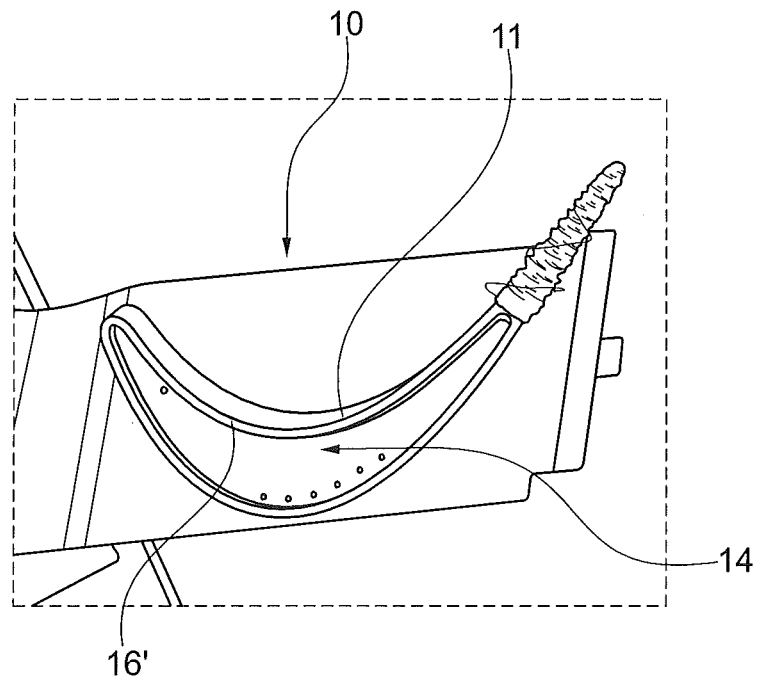
FIG. 10 shows a photograph with a top view of a blade tip similar to FIG. 3, with a new crown built-up by LMF.

Then, a new tip crown (16' in FIG. 10) is built-up by LMF with a LMF device 22 (FIG. 9) by using a laser beam 23 and supplying a powder material 24. A special oscillating welding path at the trailing edge is used for optimum weld quality and heat transport during LMF process. It is advantageous to use same filler material as with TIG welding (wire used for TIG welding), for example Haynes® 230 alloy. A respective LMF process is for example disclosed in: M. B. Henderson et al., Nickel-Based Superalloy Welding Practises for Industrial Gas Turbine Applications.

Figure 11:
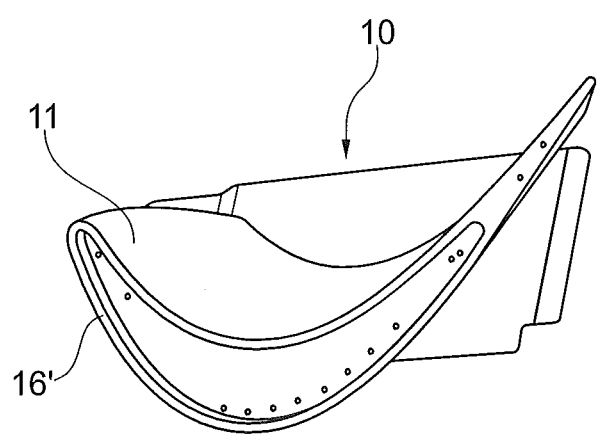
FIG. 11 shows the blade tip of FIG. 10 after fine grit blasting and before coating.

A final contouring step of the tip area by manual grinding and a CNC tip height machining leads to a repaired blade tip as shown in FIG. 11.

Following steps to be made are: coating of blade, re-drilling of closed tip cooling air holes by laser, re-opening of over-coated cooling air holes, finishing.

The advantages of the disclosed method are:

Profit from structural integrity of original cast material by preserving as much of it as possible during the repair process.

Profit from the combination of manual TIG welding and automated LMF welding: manual TIG is flexible and cheap (locational variance of tip cooling air holes and letterboxes), LMF is fast and accurate (stable and uniform process preparation by TIG welding, only slight final machining and contouring of repaired tip necessary).

The invention claimed is:

1. A method for repairing a single crystal turbine blade, which comprises an airfoil with a tip having a tip cover plate, tip cooling air holes and a tip crown, said method comprising:
   a) removing the tip crown by manual grinding, thereby preserving the underlying tip cover plate;
   b) preparing the tip cooling air holes by manual grinding;
   c) closing said prepared tip cooling air holes by manual welding; and
   d) building-up a new tip crown by a LMF (Laser Metal Forming) process
   wherein between step (c) and (d) the tip is contour-grinded in preparation for the LMF welding process.

2. The method according to claim 1, wherein the tip includes at least one letterbox, and that said at least one letterbox is prepared in step (b) by manual grinding and closed in step (c) by manual welding.

3. The method according to claim 1, wherein the tip includes at least one damaged region which extends beyond the crown into the airfoil, and that said at least one damaged region is prepared in step (b) by manual grinding and closed in step (c) by manual welding.

4. The method according to claim 1, further comprising a TIG (Tungsten Inert Gas) welding process is used for the manual welding in step (c).

5. The method according to claim 1, wherein the LMF process uses an oscillating weld path for optimum weld quality and heat transport during the LMF process.

6. The method according to claim 1, wherein after finishing the LMF process step (d) the tip area of the turbine blade is finally contoured by manual grinding.

7. The method according to claim 6, wherein the final height of the tip is established by CNC machining.

8. The method according to claim 1, wherein after finishing an outer contour of the turbine blade the blade is coated with a coating layer.

9. The method according to claim 8, wherein after coating the blade, the closed tip cooling air holes are re-drilled.

10. The method according to claim 8, wherein the turbine blade is provided with other cooling air holes outside of the tip, and that these other cooling air holes are re-opened after having been overcoated.

11. The method according to claim 9, wherein after coating the blade, the closed tip cooling air holes are re-drilled by a laser.

12. A method for repairing a single crystal turbine blade, which comprises an airfoil with a tip having a tip cover plate, tip cooling air holes and a tip crown, said method comprising:
   a) removing the tip crown by grinding, thereby preserving the underlying tip cover plate;
   b) preparing the tip cooling air holes by grinding;
   c) closing said prepared tip cooling air holes by welding; and
   d) building-up a new tip crown by a LMF (Laser Metal Forming) process
   wherein between step (c) and (d) the tip is contour-grinded in preparation for the LMF welding process.

13. The method according to claim 12, wherein the tip includes at least one letterbox, and that said at least one letterbox is prepared in step (b) by grinding and closed in step (c) by welding.

14. The method according to claim 12, wherein the tip includes at least one damaged region which extends beyond the crown into the airfoil, and that said at least one damaged region is prepared in step (b) by grinding and closed in step (c) by welding.

15. The method according to claim 12, further comprising a TIG (Tungsten Inert Gas) welding process is used for the welding in step (c).

16. The method according to claim 12, wherein the LMF process uses an oscillating weld path for optimum weld quality and heat transport during the LMF process.

17. The method according to claim 12, wherein after finishing the LMF process step (d) the tip area of the turbine blade is finally contoured by grinding.

18. The method according to claim 17, wherein the final height of the tip is established by CNC machining.

19. The method according to claim 12, wherein after finishing an outer contour of the turbine blade the blade is coated with a coating layer.

20. The method according to claim 19, wherein after coating the blade, the closed tip cooling air holes are re-drilled.

\* \* \* \* \*